United States Patent Office 3,787,372
Patented Jan. 22, 1974

3,787,372
PROCESS FOR THE PREPARATION OF AROMATIC COPOLYAMIDE-PHOSPHONAMIDES
Erich Blocker, Weilbach, and Peter Eckardt, Hofheim, Taunus, Germany, assignors to Farbwerke Hoechst Aktiengesellschaft vormals Meister Lucius & Bruning, Frankfurt am Main, Germany
No Drawing. Filed Dec. 16, 1971, Ser. No. 208,932
Claims priority, application Germany, Dec. 19, 1970,
P 20 62 774.1
Int. Cl. C08g 20/34
U.S. Cl. 260—78 R
12 Claims

ABSTRACT OF THE DISCLOSURE

New film- and fiber-forming high molecular weight aromatic copolyamide-phosphonamides are obtained by adding a phosphonic acid dihalide at elevated temperature to a melt of at least one aromatic diamine in excess, by dissolving the reaction product, after complete reaction, in a solvent of the amide kind, by adding at least one aromatic dicarboxylic acid halide to this solution at a temperature of from about −20° to +30° C., and thus polycondensing it to form a high molecular weight aromatic copolyamide-phosphonamide. Shaped articles made from these copolyamide-phosphonamides are distinguished by their good affinity to dyestuffs and poor flammability.

---

The present invention relates to a process for the preparation of aromatic copolyamide-phosphonamides.

It is known that aromatic polyamides, as compared to aliphatic or aliphatic-aromatic polyamides possess greatly improved high temperature resistance properties. They have melting points of more than 300° C. at an average, and they are distinguished by a good fire resistance and resistance to high energy radiation, for example of $\beta$- and $\gamma$-rays. However, fibers and filaments made from aromatic polyamides, for example the polyamide obtained from m-phenylene-diamine and isophthalic acid (cf. German Auslegeschrift No. 1,282,843), practically cannot be dyed, since they are very resistant to the penetration of dyestuffs. Also when swelling agents or carriers are used, the absorption of disperse dyestuffs is hardly improved.

On the other hand, polyphosphonamides are known which are prepared by reaction of phosphonic acid dichlorides with diamines, using either the interfacial polycondensation method or a solution polycondensation at low temperatures in an inert solvent (M. Sander and E. Steininger, Reviews in Macromolecular Chemistry, vol. 2 (1967), pp. 126–129). However, both methods yield only low molecular weight polyphosphonamides which are not suitable for the manufacture of filaments, fibers, films, or sheets.

Furthermore, the preparation of copolyamide-phosphonamides is described (cf. U.S. Pat. No. 3,116,268), which comprises reacting phosphonic acid dichloride with an excess of an aliphatic diamine in an inert solvent to form a low molecular weight polyphosphonamide having terminal amino groups, and then reacting this polyphosphonamide with a dicarboxylic acid chloride according to the interfacial polycondensation method, so that a copolyamide-phosphonamide is obtained. But also the copolyphosphonamides so obtained have only relatively low viscosities or molecular weights.

High molecular weight aromatic polyamides of the aforementioned kind suitable for the manufacture of filaments, fibers, films or sheets are obtained, as is known, from aromatic diamines and aromatic dicarboxylic acid chlorides by means of low temperature polycondensation in solution. As solvents, there are preferably employed those of the amide kind, for example N,N-dimethylacetamide, N-methylpyrrolidone-(2), hexamethyl-phosphoric acid triamide or tetramethyl urea, since these solvents, as weakly basic media, can bind the hydrochloric acid which is formed in the polycondensation reaction, and, furthermore, have an excellent solvency for the aromatic polyamides obtained, so that high molecular weights are easily achieved. Aromatic copolyamides can be obtained in the same manner by using a mixture of diamines or reacting a solution of one or more diamines with one or more dicarboxylic acid halides, either simultaneously or one after the other.

In the case where phosphonic acid dichlorides are used as components for the preparation of aromatic polyamides by polycondensation in an amide solvent, either mixed with an aromatic dicarboxylic acid chloride or separately added to the diamine solution before or after the addition of the dicarboxylic acid chloride, polyamides having only a very low molecular weight are obtained which cannot be employed for the manufacture of filaments, fibers, films or sheets. Also a two-step polycondensation, which comprises a precondensation of the phosphonic acid dichloride in known manner with an excess of an aromatic diamine in an inert solvent, a subsequent addition of this solution to the diamine solution in a solvent for polyamides, and a normal polycondensation, with addition of the theoretically necessary quantity of a dicarboxylic acid halide, at low temperature, does not yield high molecular weight copolyamide-phosphonamides.

It has now been found that high molecular weight aromatic copolyamide-phosphonamides can be prepared by adding a phosphonic acid dihalide, preferably phosphonic acid dichloride, at elevated temperature to a melt of at least one aromatic diamine in excess, by dissolving the reaction product, after complete reaction, in a solvent of the amide kind, and by polycondensing it with at least one aromatic dicarboxylic acid halide, preferably a dicarboxylic acid chloride, to form a high molecular weight aromatic copolyamide-phosphonamide.

The elevated temperature, at which the phosphonic acid dihalide is added to the diamine melt, should be from 60° to 200° C., preferably from 80° to 130° C. Of course, the temperature must be always above the melting temperature of the aromatic diamine or the diamine mixture. The phosphonic acid dihalide is reacted with the molten diamines by introducing it dropwise, with agitation, into the hot melt. The hydrogen halide which is formed during the reaction is bound by the diamine present in excess. The diamine hydrohalide, at the elevated temperature, often remains dissolved in the melt or causes a turbidity of the reaction mass during the dropwise addition of the phosphonic acid dihalide. The reaction is practically complete after a short time. Generally, after the end of the dropwise feeding operation, agitation is continued for 5 to 30 minutes at the same temperature. After the reaction product has cooled, it is polycondensed in the same manner as a pure diamine according to known methods, for example as described in German Offenlegungsschrift No. 1,420,681 and No. 1,420,682, with at least one aromatic dicarboxylic acid halide, preferably dicarboxylic acid chloride, to form a corresponding high molecular weight copolyamide-phosphonamide. Advantageously, a solution polycondensation in a solvent of the amide kind, for example N,N-dimethylacetamide, N-methylpyrrolidone-(2), hexamethyl-phosphoric acid triamide or tetramethyl urea, substantially at a temperature of from about −20° to +30° C., is carried out; the copolyamide-phosphonamide obtained remaining dissolved. Also other known polycondensation processes, for example in emulsion or interfacial systems, may be used, but these latter methods are less advantageous.

The amounts of phosphonic acid dihalide/dicarboxylic acid halide(s) used should be chosen in a way as to ensure a molar ratio of phosphonic acid halide to dicarboxylic acid halide(s) of from 1 to 30 to from 99 to 70. Optionally, small amounts of aliphatic and/or cycloaliphatic diamines or dicarboxylic acid halides may be added to the aromatic diamines and the aromatic dicarboxylic acid halides; these small amounts, however, should not exceed 10 mol percent, relative to the total diamine amount or the amount of phosphonic acid dihalide and dicarboxylic acid dihalide. However, the preparation of copolyamide-phosphonamides modified by small amounts of aliphatic components is less advantageous.

The hydrogen halide which is formed in the reaction of the phosphonic acid dihalides with the aromatic diamines may be bound also by adding a tertiary base, for example pyridine or ethyl-di-isopropylamine, instead of using the diamine excess for this purpose. The salts of these bases do not adversely affect the subsequent polycondensation.

When the polycondensation is carried out in a solvent of the amide kind, a highly viscous solution of the copolyamide-phosphonamide is obtained, which has an acidic reaction on account of the hydrogen halide bound by the solvent. Either the polymer may be isolated from this solution by precipitation with a non-solvent, for example water, or the polymer solution, after the hydrogen halide is neutralized with a suitable base, is processed directly to form filaments, films or sheets. Suitable substances for the neutralization are especially lithium hydroxide or calcium hydroxide, since the chlorides thereof are soluble in the solvents employed, and, by forming complexes with the polyamides, increase the solubility thereof and simultaneously stabilize the solution.

In order to impart good properties to the fibers, filaments or films and sheets manufactured from these copolyamide-phosphonamides, they must have a sufficiently high molecular weight; i.e. the inherent viscosity of the polymers, measured in dimethylacetamide containing 2% of $CaCl_2$, should be at least 1.0. The inherent viscosity may be calculated from the relative viscosity (measured at 25 C. in a solution of 0.5 g. of the polymer in 100 cm.³ of dimethylacetamide/2% $CaCl_2$) according to the following equation $$\eta_{inh.} = \frac{\ln \eta \text{ rel.}}{c}$$

where $c$ is the amount of polymer in grams which is contained in 100 cm.³ of the solvent.

Regarding the phosphonic acid dihalides, aromatic diamines and aromatic dicarboxylic acid halides suitable as starting substances for the process of the invention, the following compounds may be employed:

Suitable phosphonic acid dihalides are bromides or chlorides, preferably chlorides, of aliphatic, cycloaliphatic or aromatic phosphonic acids, for example methyl-, ethyl-, n- or i-propylphosphonic acid dichloride, cyclohexyl-phosphonic acid dichloride, phenyl-, tolyl- or naphthyl-phosphonic acid dichloride, Especially preferred are phenyl-phosphonic acid dichloride and cyclohexyl-phosphonic acid dichloride.

Suitable aromatic diamines are for example m- or p-phenylene diamine, benzidine, 4,4'-diamino-diphenyl-methane, 4,4'-diaminostilbene, 4,4'-diamino-diphenyl ether, 4,4'-diamino-diphenylsulfone or diaminonaphthalenes having amino groups not being in ortho- or peri-position; these diamines may also carry substituents, for example lower alkyl, lower alkoxy, halogen, nitro or carbalkoxy groups. m-phenylene-diamine is especially advantageous. When small amounts of aliphatic and/or cycloaliphatic diamines shall be added to the aromatic diamines, there may be employed for example penta- or hexamethylene diamine, 1,4-bis(aminomethyl)-cyclohexane or piperazine.

Suitable dicarboxylic acid halides are for example isophthaloyl chloride or terephthaloyl chloride or the bromides thereof, furthermore polynuclear compounds having acid halide groups in meta- or para-position, such as 4,4'-diphenyl-dicarboxylic acid chloride, 4,4'-oxy-dibenzoyl chloride or 4,4'-sulfonyldibenzoyl chloride. Apart from these simple dicarboxylic acid halides also those having lower alkyl, lower alkoxy, halogen, nitro, phenyl, carbalkoxy or other groups may be used. Isophthaloyl chloride is especially advantageous. When small amounts of aliphatic and/or cycloaliphatic dicarboxylic acid halides shall also be used, there may be chosen for example adipic acid chloride, sebacic acid chloride, fumaric acid chloride or hexahydroterephthalic acid chloride.

Phosphonamide bonds generally are sensitive to hydrolysis and can be degraded much more easily than carbonamide bonds. However, this easy hydrolyzability of the P-N-bonds is considerably decreased in the copolymers prepared according to the process of the invention, and it has no negative influence on the practical use thereof. After 10 hours in boiling water, there is practically no viscosity decrease in a copolyamide made from m-phenylene-diamine as amine component and containing 10 mol percent of phenyl-phosphonic acid dichloride and 90 mol percent of isophthaloyl chloride, and, after a 30 hour treatment in boiling water, the relative viscosity of the polymer has decreased for only 5%. So, the phosphonamide bonds are practically not hydrolyzed in a neutral medium. They are, however, rapidly hydrolyzed in concentrated sulfuric acid, i.e. they dissolve in it with considerable decrease of the molecular weight. Pure aromatic polyamides, on the other hand, dissolve in concentrated sulfuric acid without degradation, so that the viscosity $\eta_{rel.}$ or $\eta_{inh.}$ thereof generally is measured in this medium. Thus, in concentrated sulfuric acid, a determined hydrolysis of the phosphonamide bonds in the copolyamide-phosphonamides takes place.

Besides the phosphonic acid dihalides, it is possible to simultaneously incorporate other monomers into the aromatic polyamides in order to produce a determined alteration of the properties thereof. Thus, in addition to phenyl-phosphonic acid dichloride, also a diamino-benzenesulfonic acid or the alkali metal salts thereof, or a sulfobenzene-dicarboxylic acid halide may be inserted by condensation, so that besides a good affinity to disperse dyestuffs simultaneously an affinity to cationic dyestuffs is obtained.

The aromatic copolyamide-phosphonamides prepared according to the present invention can be processed to form filaments, fibers, films or sheets. As compared to the known aromatic polyamides which cannot be dyed, the advantage of the copolyamide-phosphonamides in accordance with the invention resides in the fact that they can excellently be dyed with disperse dyestuffs, so that they are most suitably used also in the textile industry. Moreover, the aromatic copolyamide-phosphonamides are even less combustible than unmodified aromatic polyamides. They are practically non-flammable and also show no afterglow when the flame has been removed. On account of this property, they are greatly appropriate for fire protection clothing and other flame-proof textiles. Furthermore, the copolyamide-phosphonamides are suitable for example for the preparation of high temperature resistant electric insulations, of filter media and the like. In the aviation industry, these materials may be used for example for parachutes, fuel tanks, tires, pipes, hoses or insulations.

The following examples illustrate the invention.

EXAMPLE 1

215.1 g. of m-phenylene-diamine are molten, under a current of dry nitrogen, in a four-necked flask having a capacity of 4 liters and equipped with a metal agitator and a thermometer, and heated to 120° C. in an oil bath. 19.4 g. (5 mol percent) of phenylphosphonic acid dichloride are added dropwise, with agitation, and the reaction mixture is subsequently maintained at 120° C. for a further 15 minutes. After cooling to 80° C. or less, 1990 ml. of dimethylacetamide are added, and the melt is dissolved by agitation. By means of a cooling bath, the solution is cooled to about −10° C., and 384.0 g. (95 mol percent) of molten isophthaloyl chloride are added dropwise, while passing through a heatable dosage funnel, so that the temperature of the reaction mixture remains below 0° C. Agitation is then continued for about 1 hour at room temperature, whereby the final viscosity of the reaction mixture establishes itself. In order to neutralize the partially precipitated dimethylacetamide hydrochloride, a fine suspension of 151 g. of calcium hydroxide in 550 ml. of dimethylacetamide is added and agitated until the hydroxide is dissolved. In order to isolate the copolyamide-phosphonamide, the polymer solution is precipitated in water, the polymer is washed with water until it is free from solvent and chloride, and dried in vacuo at 120° C.

The inherent viscosity of the polymer, measured in dimethylacetamide containing 2% of $CaCl_2$, is 1.82, and it contains 0.6% of phosphorus (calculated: 0.65% or P).

The polymer is then dissolved in dimethylacetamide containing about 2% of calcium chloride, so that a 22% polymer solution is obtained, which is subsequently spun through a nozzle having 100 holes of a diameter of 150μ into a coagulation bath composed of 50 parts of water, 10 parts of dimethylacetamide and 40 parts of calcium chloride. After having passed through several washing baths, the filament is after-drawn and fixed at 300° C.; the total drawing ratio being 1:2.75. The filament has a total titer of 178 dtex., an ultimate tensile strength of 2.9 g./dtex., and an elongation at break of 21.3%.

EXAMPLE 2

159.3 g. of m-phenylene-diamine are molten in an oil bath of 130° C. under a current of dry nitrogen, and 43.2 g. (15 mol percent) of phenyl-phosphonic acid dichloride are added dropwise at this temperature with thorough agitation. Agitation is continued for a further 15 minutes at 130° C., and the reaction mixture is cooled to room temperature. After the reaction product is dissolved in 1470 ml. of dimethylacetamide, the solution is cooled to about −10° C. At a temperature of from −10° C. to 0° C., 254.5 g. (85 mol percent) of molten isophthaloyl chloride are added dropwise through a heatable dosage funnel. Subsequently, the reaction mixture is heated to room temperature, and agitation is continued for at least 30 minutes at 20–30° C. The highly viscous solution is then neutralized by adding a suspension of 112 g. of calcium hydroxide in 200 ml. of dimethylacetamide. The clear polymer solution is precipitated in water, and the polyamide is washed and dried. The inherent viscosity of the copolyamide-phosphonamide is 1.89. Subsequently, it is dissolved in dimethylacetamide/2% $CaCl_2$, so that a 20% polymer solution is obtained, and spun to form filaments as described in Ex. 1. These filaments have a total titer of 162.5 dtex., an ultimate tensile strength of 3.9 g./dtex. and an elongation at break of 50.4%.

EXAMPLE 3

171.2 g. of m-phenylene-diamine are molten in an oil bath under a current of dry nitrogen, and 61.85 g. (20 mol percent) of phenyl-phosphonic acid dichloride are added dropwise at 130° C. with thorough agitation. After this addition, the temperature of 130° C. is maintained for another 15 minutes, and agitation is then continued for 30 minutes without heating, which causes the reaction mixture to cool to room temperature. After the reaction product is dissolved in 1580 ml. of dimethylacetamide, the solution is cooled to −10° C., and, in the same manner as described in the examples before, 261.6 g. (80 mol percent) of isophthaloyl chloride are added dropwise at a temperature of from −10° C. to 0° C. Agitation is continued for about 1 hour at 30° C., the polymer solution is then neutralized with a suspension of 120.2 g. of calcium hydroxide in 200 ml. of dimethylacetamide, and the copolyamide-phosphonamide containing 2.6% of phosphorus is isolated by precipitation in water. Its inherent viscosity is 1.88.

EXAMPLE 4

108.1 g. of p-phenylene-diamine are molten under nitrogen, and 19.5 g. (10 mol percent) of phenyl-phosphonic acid chloride are added dropwise with thorough agitation at 150–160° C. Agitation is then continued for 10 minutes at the same temperature. After the reaction mixture has cooled, it is dissolved in 1000 ml. of dimethylacetamide. As described in Example 1, 182.7 g. (90 mol percent) of isophthaloyl chloride are added dropwise, and the whole is condensed to form a highly viscous polymer solution. The inherent viscosity of the copolyamide-phosphonamide in dimethylacetamide/2% $CaCl_2$ is 2.21.

EXAMPLE 5

107.3 g. of m-phenylene-diamine are molten under nitrogen in a four-necked flask having a capacity of 250 ml., and 19.94 g. (10 mol percent) of cyclohexyl-phosphonic acid dichloride are added dropwise with agitation in a manner as to maintain a temperature of the reaction mixture in the range of from 80° to 100° C. After complete addition, agitation is continued for another 15 minutes at a temperature in this range. After a slight cooling, the reaction product is transferred into a four-necked flask having a capacity of 4 liters, and dissolved in 1000 ml. of dimethyl acetamide. The condensation is subsequently carried out, as described in Examples 1 to 3, with 181.3 g. (90 mol percent) of isophthaloyl chloride in order to form a high molecular weight copolyamide-phosphonamide, and this polymer is isolated from the solution as indicated above. The inherent viscosity of the polymer is 2.42.

EXAMPLE 6

109.1 g. of m-phenylene-diamine are molten as described in Example 5, and 8.83 g. (5 mol percent) of n-butane-phosphonic acid dichloride (isomer mixture) are added at a temperature of from 70° to 80° C. After the agitation has been continued at this temperature for a further 15 minutes, the melt is transferred into the larger polycondensation vessel, dissolved in 1000 ml. of dimethylacetamide, and 196.2 g. of isophthaloyl chloride are added dropwise, as described in Example 1. The highly viscous polymer solution, which is formed while continuing the agitation at room temperature or above, is worked up as usual. The inherent viscosity of the copolyamide-phosphonamide so obtained is 1.73.

EXAMPLE 7

109.0 g. (98 mol percent) of m-phenylene-diamine are molten as described in Example 5, and 10.03 g. (5 mol percent) of phenyl-phosphonic acid dichloride are added dropwise with thorough agitation at 120° to 140° C. 5 minutes after complete addition, the reaction product is allowed to cool, and then dissolved in 1030 ml. of dimethylacetamide. 4.32 g. (2 mol percent) of the sodium salt of 1,3-diaminobenzene-4-sulfonic acid are added, and the whole is condensed, as described in Example 1, with 198.4 g. (95 mol percent) of isophthaloyl chloride to form an aromatic copolyamide-phosphonamide modified by sulfonate groups. The inherent viscosity of the polymer is 2.12.

EXAMPLE 8

116.3 g. (98 mol percent) of m-phenylene-diamine are molten as described in Example 5, and 27.57 g. (12.5 mol percent of cyclohexylphosphonic acid dichloride are added dropwise within 15 minutes at 70°–80° C. Agitation is continued at this temperature for a further 15 minutes. The reaction product is then dissolved in 1100 ml. of dimethylacetamide, 4.61 g. (2 mol percent) of the sodium salt of 1,3-diaminobenzene-4-sulfonic acid are added, and the whole is condensed, as described in Example 1, with 194.95 g. (87.5 mol percent) of isophthaloyl chloride to form a highly viscous copolyamide-phosphonamide, which has a good affinity also to cationic dyestuffs. The inherent viscosity of the polymer is 1.84.

What is claimed is:

1. A process for the preparation of fiber forming aromatic copolyamide-phosphonamides which comprises adding slowly with agitation a hydrocarbon phosphonic acid dihalide at temperatures of from 60 to 200° C. to a melt of at least one aromatic carbocyclic diamine in excess, then dissolving, after complete reaction, the resulting reaction mixture in an inert amide solvent and adding at least one aromatic carbocyclic dicarboxylic acid dihalide to this solution at a temperature of from about −20° C. to +30° C., and polycondensing to form a fiber forming aromatic copolyamide-phosphonamide.

2. The process as claimed in claim 1, wherein the temperature at which the phosphonic acid dihalide is added in excess to a melt of at least one aromatic diamine is from 80° to 130° C.

3. The process as claimed in claim 1, wherein the inert amide solvent is N,N-dimethylacetamide, N-methyl-pyrrolidone-(2), hexamethyl-phosphoric acid tri-amide or tetra-methyl urea.

4. The process as claimed in claim 1, wherein the molar ratio of hydrocarbon phosphonic acid dihalide to a carbocyclic dicarboxylic acid dihalide is from 1 to 30 to from 99 to 70.

5. The process as claimed in claim 1, wherein the polycondensation is carried out until an inherent viscosity of the copolyamide-phosphonamide of at least 1.0, measured in a solution of 0.5 g. of the polymer in 100 cm.³ of dimethylacetamide containing 2 weight percent CaCl₂ is obtained.

6. The process as claimed in claim 1, wherein the phosphonic acid dihalide is phenyl-phosphonic acid dichloride.

7. The process as claimed in claim 1, wherein the phosphonic acid dihalide is cyclohexyl-phosphonic acid dichloride.

8. The process as claimed in claim 1, wherein the aromatic carbocyclic diamine is m-phenylene diamine.

9. The process as claimed in claim 1, wherein the aromatic carbocyclic dicarboxylic acid dihalide is isophthaloyl chloride.

10. A fiber forming copolyamide-phosphonamide consisting essentially of polymeric condensation products of (1) a hydrocarbon phosphonic acid dihalide, (2) at least one aromatic carbocyclic diamine and (3) at least one aromatic carbocyclic dicarboxylic acid dihalide produced by the process of claim 1.

11. A filament, fiber, film or sheet consisting essentially of polymeric condensation products of (1) a hydrocarbon phosphonic acid dihalide, (2) at least one aromatic carbocyclic diamine and (3) at least one aromatic carbocyclic dicarboxylic acid dihalide produced by the process of claim 1.

12. A process for the preparation of fiber forming aromatic copolyamide-phosphonamides which comprises adding slowly with agitation a hydrocarbon phosphonic acid dihalide at temperatures of from 60 to 200° C. to a melt of at least one aromatic carbocyclic diamine in excess, then dissolving, after complete reaction, the resulting reaction mixture in an inert amide solvent and adding at least one aromatic carbocyclic dicarboxylic acid dichloride to this solution at a temperature of from about −20° C. to +30° C., and polycondensing to form a fiber aromatic copolyamide-phosphonamide.

References Cited
UNITED STATES PATENTS

| | | | |
|---|---|---|---|
| 2,646,420 | 7/1953 | Morgan | 260—78 R |
| 2,976,267 | 3/1961 | Caldwell et al. | 260—78 R |
| 3,043,810 | 7/1962 | Deichert et al. | 260—78 R |
| 3,108,991 | 10/1963 | Pellon et al. | 260—78 R |
| 3,116,268 | 11/1963 | Farago | 260—77.5 R |

HAROLD D. ANDERSON, Primary Examiner

U.S. Cl. X.R.

260—32.6 N, 47 CZ, 78 UA, 78 S, 78 SC; 264—176 F